United States Patent [19]

Mason

[11] Patent Number: 4,716,092
[45] Date of Patent: Dec. 29, 1987

[54] TRANSPARENCY FILM ASSEMBLAGE AND ROLLER ASSEMBLY FOR USE THEREWITH

[75] Inventor: Paul B. Mason, Magnolia, Mass.

[73] Assignee: Polaroid Corporation, Cambridge, Mass.

[21] Appl. No.: 902,774

[22] Filed: Sep. 2, 1986

[51] Int. Cl.⁴ .................... G03C 5/54; G03C 3/00; G03D 5/02
[52] U.S. Cl. ................................ 430/209; 430/207; 354/304
[58] Field of Search ................. 430/207, 209; 354/304

[56] References Cited
U.S. PATENT DOCUMENTS

| | | | |
|---|---|---|---|
| 3,225,671 | 12/1965 | Friedman | 95/13 |
| 3,396,647 | 8/1968 | Downey | 95/13 |
| 4,279,988 | 7/1981 | Ewald | 430/499 |
| 4,600,680 | 7/1986 | Fichter | 430/207 |

Primary Examiner—Richard L. Schilling
Attorney, Agent, or Firm—Alfred E. Corrigan

[57] ABSTRACT

A transparency film assemblage having a film frame of the instant or self-developing type and a roller assembly specifically adapted for use with the assemblage during the spreading of a processing liquid between an emulsion side of the film frame and a strip sheet. The film assemblage includes a sheet of material having a tab at one end which when pulled, subsequent to the spreading of the processing liquid between the film frame's emulsion side and a strip sheet, removes the strip sheet from covering relation with the film frame while simultaneously covering the film frame's emulsion layer which is now attached to the strip sheet. The roller assembly includes a pair of rollers which are configured to provide a sequence of gaps having varying predetermined thicknesses during the movement of a film assemblage therebetween.

4 Claims, 4 Drawing Figures

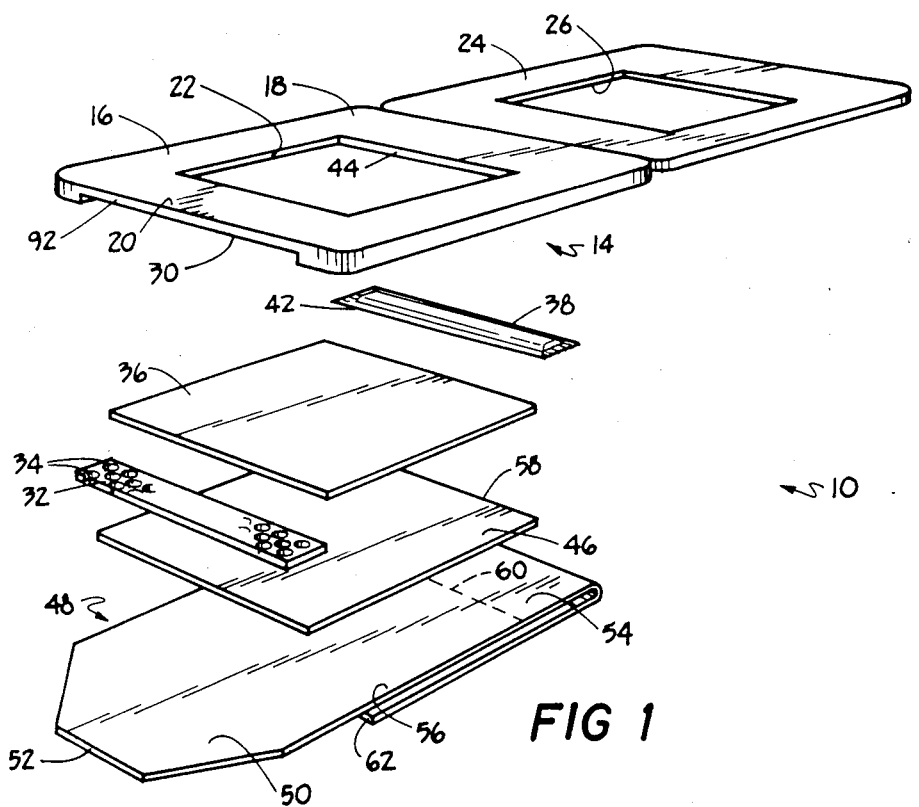
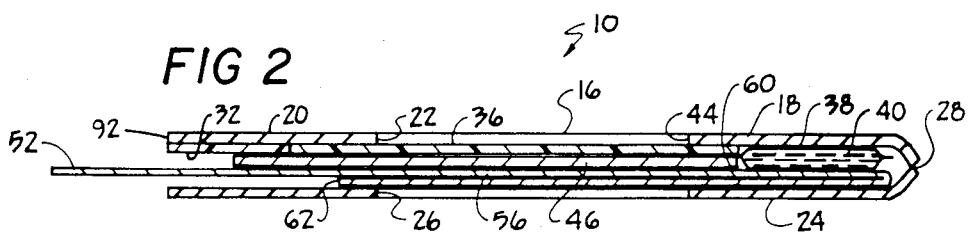

TRANSPARENCY FILM ASSEMBLAGE AND ROLLER ASSEMBLY FOR USE THEREWITH

BACKGROUND OF THE INVENTION

1. Field of the Invention

A transparency film assemblage of the instant or self-developing type and a roller assembly specifically adapted for use therewith.

2. Description of the Prior Art

The present invention relates to a transparency film assemblage of the type including a frame of instant or self-developing type transparency film of a type similar to that described in U.S. Pat. No. 4,375,324 and preferably of a 35 mm format; and to a roller assembly for rupturing a container of processing liquid carried by the film assemblage and spreading its contents across a layer of the film frame so as to initiate the formation of a visible image within the film frame. More specifically, the film assemblage is of a type which is ready to be inserted into a projector or viewer immediately after its processing.

The prior art is replete with film assemblages which include, as an element thereof, a chip or frame of instant or self-developing type transparency film, either black and white or full color and with roller assemblies for use therewith. For examples of such assemblages and roller assemblies reference may be had to U.S. Pat. Nos. 4,600,680, 3,396,647, and 3,225,671. One of the less desirable aspects of the film assemblages disclosed in the '647 and '671 patents is that one of the final steps in the processing of the film assemblage is the stripping of the film unit's negative or emulsion layer from the remainder of film frame, which stripped negative or emulsion layer has an exposed residue of components of the processing operation on one surface thereof which may be caustic. Further, while the roller assemblies described therein are designed for spreading a processing liquid across the film frame, they are not designed to simultaneously advance the film assemblage; nor is their pressure generating gap adjusted during the spreading of the processing liquid so as to accommodate varying thicknesses in the film assemblages. As regard the '680 patent, it recognizes the need to protect the user of the film assemblage from the possible adverse affects of the contaminants carried by the stripping sheet by coiling the stripping sheet into a roll and permanently depositing it in a recess formed between two sections of a film transparency mount. However, such disposal requires adding to the cost of the film mount by providing such a recess. Also, there is the danger of any of the liquids carried by the coiled strip sheet leaking from the recess.

SUMMARY OF THE INVENTION

The present invention relates to a transparency film assemblage of the type including instant or self-developing film, and to a roller assembly specifically adapted for use therewith.

The transparency film assemblage includes a film mount comprised of first and second apertured sections which are adapted to be located in superposition with each other with an unexposed frame of instant type transparency film sandwiched therebetween and in alignment with the apertures in the first and second frame sections. Also sandwiched between these frame sections are (1) a pod or container of processing liquid having a rupturable end located closely adjacent to an edge of the film frame, (2) a trap located adjacent an opposite end of the film frame for receiving any excess processing liquid, (3) a first sheet (strip sheet) located in covering relation to the emulsion side of the film frame, and (4) a second sheet having a free end, which protrudes from between the first and second sections of the film mount, and an intermediate portion attached to an end of the first sheet.

The roller assembly includes a pair of rollers mounted for rotation about substantially parallel axes. Each of the rollers includes first, second, and third circumferential surfaces which cooperate with each other to define first, second and third gaps, respectively, with at least two of the gaps having different thicknesses. More specifically, the thickness of the first gap is selected to provide the proper amount of compression to the end of the film assemblage having the pod or container of processing liquid so as to enable the rollers to rupture the pod and direct its contents toward the film frame. The thickness of the second gap is selected to provide the optimum thickness (0.0015 inches) of the layer of processing liquid to be spread across a layer (emulsion side) of the film frame, and the thickness of the third gap is selected so as to relieve the pressure on any remaining processing liquid as it approaches the trap end of the film assemblage, thereby enabling the trap to more efficiently contain the excess processing liquid.

The roller assembly further includes a motor, and appropriate electrical circuit, for rotating at least one of the rollers through one revolution. One or both of the rollers includes a protuberance, which extends into the gap between the rollers when they are at rest, which is adapted to be engaged and moved by a leading edge of an advancing film assemblage. Such movement of the protuberance and its associated roller is effective to connect the motor to a battery via a normally closed switch. The rollers continue the advancement of the film assemblage while simultaneously, automatically, changing the thickness of the gap therebetween. As the rollers near the end of one revolution, the aformentioned switch is cammed into an open position thereby stopping rotation of the rollers. Also, as the rollers approach the end of the aforementioned revolution, the protuberance(s) engages the trailing edge of the film assemblage and assists its movement from between the rollers.

An object of the invention is to provide a transparency film assemblage which includes a frame of instant type film having a strippable emulsion layer with means for simultaneously covering such emulsion layer as it is being removed from the remainder of the film frame.

Another object of the invention is to provide such a transparency film assemblage which is ready for placement in a projector upon removing the emulsion layer from the film frame.

Still another object of the invention is to provide a roller assembly having a pair of pregapped rollers for rupturing a container of processing liquid and spreading its contents across a layer of an exposed film frame, the thickness of the gap between the rollers automatically changing in a predetermined sequence.

Other objects of the invention will in part be obvious and will in part appear hereinafter.

The invention accordingly comprises the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 1 is an exploded perspective view of a preferred embodiment of a transparency film assemblage;

FIG. 2 is a side elevation in cross section of the film assemblage shown in FIG. 1;

DETAILED DESCRIPTION OF THE INVENTION

Figure 3:
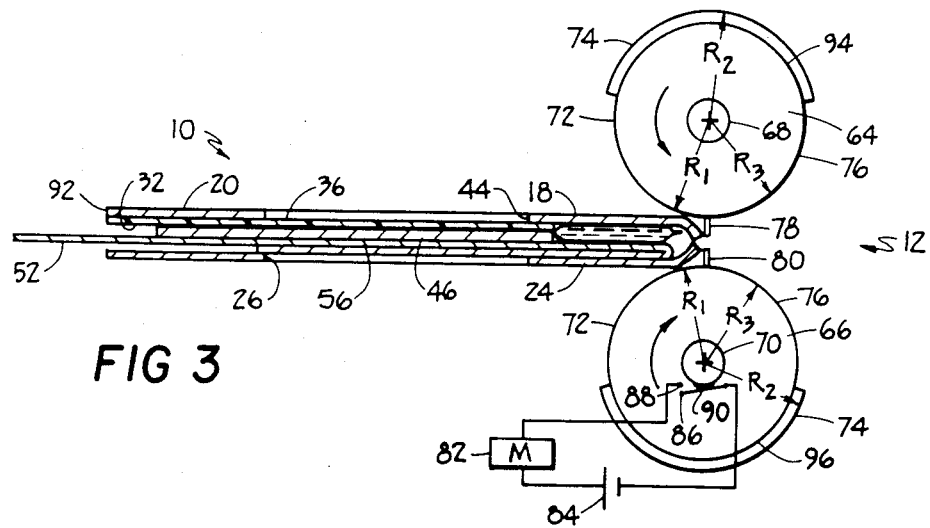
FIG. 3 is a side elevational view, partly in section of the film assemblage as it enters the gap of a roller assembly specifically adapted for use therewith.

Reference is now made to the drawings wherein is shown a preferred embodiment of a transparency film assemblage 10 and a roller assembly 12 specifically adapted for use therewith.

The transparency film assemblage 10 comprises a transparency mount 14 which includes a first section 16 having first and second ends 18 and 20, respectively, separated by a first aperture 22, and a second section 24 having a second aperture 26 therein, said second section 24 being adapted to be folded in a clockwise direction about an interconnecting hinge 28 into face-to-face relation with the first section 16, with the apertures 22 and 26 located in alignment with each other, and secured to the first section 16 by any suitable means such as adhesive coatings or mechanical snaps. The first section 16 is recessed on its under surface at 30 so as to accommodate a trap 32 having a plurality of apertures 34 therein, a frame of instant type transparency film 36, and first and second sheets of material to be described later. Any suitable means may be used for adhering the trap 32 and the film frame 36 to the first section 16. Secured to the under surface of the first end 18 of the first section 16 is a pod or container 38 of processing liquid 40 having a rupturable end 42 located adjacent to one side 44 of the first aperture 22.

A first sheet 46 of flexible material is located in covering relation to the emulsion side of the film frame 36 and is adapted to assist in the spreading of the processing liquid 40 across the emulsion side of the film frame 36. A second sheet 48 of flexible material is located between the first sheet 46 and the second section 24 of the film mount 14. The second sheet 48 includes a first portion 50 having a free end 52, a second portion 54 having an area (length and width) at least coextensive to that of the first sheet 46 and an intermediate portion 56 which is fixedly attached to an end 58 of the first sheet 46 along a transversely extending line 60. The second portion 54 extends rearwardly from the line 60 and is then folded under itself so as to extend forwardly, i.e., to the left as viewed in FIGS. 1 and 2, to a position whereat its free end 62 is releasably secured to the second section 24 of the frame 14. Each of the first and second sheets 46 and 48, has a width slightly less than the corresponding width of the recess 30 in the first section 16 of the film mount 14. At this point it should be noted that either of the sheets 46 or 48 may be opaque, or the emulsion side of the film frame 36, i.e., the side most removed from the first section 16 of the film mount 14, may contain an opaque layer, thus permitting a plurality of the film assemblages 10 to be located in a stack when an endmost film assemblage is being photographically exposed without also simultaneously exposing an underlying film assemblage.

The roller assembly 12 includes a pair of pregapped elongated rollers 64 and 66 whose journals 68 and 70 are suitably supported within bearings (not shown) for rotation about substantially parallel axes. The rollers 64 and 66 are substantially identical except for a cam 72 located on one of the journals 70 of the lowermost roller 66. Each of the rollers 64 and 66 includes first, second, and third circumferential surfaces 72, 74, and 76, respectively, having radii $R_1$, $R_2$, and $R_3$, respectively, with $R_1$ equal to $R_3$ and less than $R_2$. A protuberance 78 extends downwardly from the roller 64 at a location between the first and third circumferential surfaces 72 and 76 and a corresponding protuberance 80 extends upwardly from the roller 66 at a location between its first and third circumferential surfaces 72 and 76.

The rollers 64 and 66 are geared to each by means (not shown) for simultaneous rotation in the direction of the arrows shown in FIG. 3. A motor 82 is connected to one of the rollers 64 or 66 for driving it in the appropriate direction. The motor 82 is adapted to be connected to a battery 84 by an electrical circuit having a normally closed switch therein. The switch includes a movable contact 86 which is biased toward engagement with a fixed contact 88. When the rollers 64 and 66 are at rest, as shown in FIG. 3, a cam 90 on a portion of the journal 70 keeps the contact 86 out of engagement with fixed contact 88.

In use, a film cassette containing a stack of the transparency film assemblages 10 is loaded into a camera containing the roller assembly 12. After an endmost one of the film assemblages 10 is photographically exposed, its trailing edge 92 is engaged by any suitable film advancing means (not shown) and moved into the gap between the rollers 64 and 66 until its opposite edge (leading edge) engages and moves the protuberances 78 and 80. Such movement of the protuberances 78 and 80 causes a slight rotation of the associated rollers 64 and 66, respectively. With respect to the roller 66, such rotation is in a clockwise direction which moves the cam 90 out of engagement with the movable contact 86 thereby allowing it to engage the fixed contact 88 and thus connect the motor 82 to the battery 84. The motor 82 drives the rollers 64 and 66 through approximately one revolution at which time the cam 90 rotates into engagement with the movable contact 86 thus opening the switch and stopping the motor 82 and rotation of the rollers 64 and 66. During the one revolution, the circumferential surfaces 72 of the rollers 64 and 66 define a first gap having a thickness sufficient to rupture the container 38 and spread the processing liquid 40 in a layer between the emulsion side of the film frame 36 and the first sheet 46 while simultaneously advancing the film assemblage 10 to the right, as viewed in FIG. 3. Continued rotation of the rollers 64 and 66 brings the circumferential surfaces 74 into facing relation with each other to define a second gap, said second gap having a thickness less than the aforementioned first gap.

As best seen in FIG. 3, the second circumferential surface 74 is spaced from the first and third circumferential surfaces 72 and 76, respectively, by an amount which is slightly less than the thickness of one of the first or second sections 16 or 24 of the film mount 14; and the circumferential surface 74 also has a length, as measured along its arc, substantially equal to the corresponding measurement of the first aperture 22, as measured from the edge 44 to the opposite edge of the first aperture 22.

Figure 4:
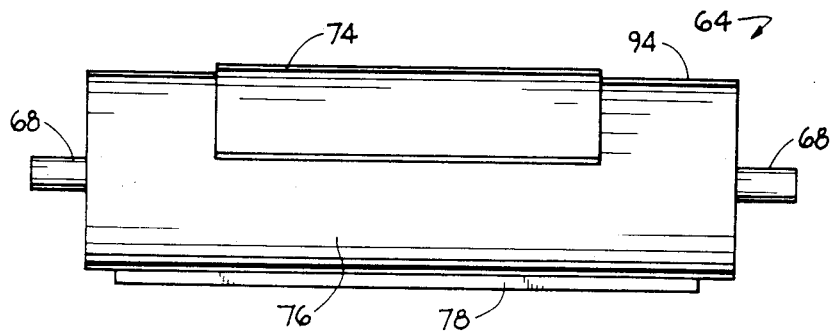
FIG. 4 is an enlarged front elevational view of the top roller of the roller assembly shown in FIG. 3.

Also, as best seen in FIG. 4, the second circumferential surface 74 has a width, as measured along a line parallel to the rotational axis of its associated roller, approximately equal to the width of one of the first or second apertures 22 or 26, as measured in a direction transverse to the direction of movement of the film assemblage blage 10 between the rollers 64 and 66.

As the rollers 64 and 66 start to define the second gap, the circumferential surfaces 74 enter the first and second apertures 22 and 26 in the film mount 14 while end portions 94 and 96, having a radius equal to that of $R_1$ or $R_3$, continue to engage the lateral sides of the film frame 14 so as to continue its advancement to the right as the second circumferential surfaces 74 control the thickness of the uniform layer of processing liquid 40 being spread between the film frame 36 and the first sheet 46. Finally, the third circumferential surfaces 76 are rotated into facing relation with each other to define a third gap as the second circumferential surfaces 74 move out of the apertures 22 and 26 in the film mount 14. The thickness of the third gap is greater than that of the second gap, thereby relieving some of the pressure on any processing liquid that may be left from the spreading operation and allowing it to be contained by the trap 32. As the third circumferential surfaces 76 rotate out of engagement with the film mount 14, the protuberances 78 and 80 move into engagement with the film mount's trailing edge 92 and assist in pushing the film assemblage 10 out of the gap between the rollers 64 and 66. The film assemblage 10 is then allowed to remain in a relatively lightfree environment until a visible positive image has been formed in the film frame 36.

After the formation of the image has been substantially completed, the film assemblage 10 is removed from the camera and the tab or end 52 manually pulled to the left, as viewed in FIG. 4. Such action results in the second sheet 48 being gradually removed from between the two sections 16 and 24 of the film mount 14, thus causing two events to occur simultaneously. First, because of the attachment between the first and second sheets 46 and 48 at 60, the end 58 of the first sheet 46 is pulled slightly downward and then under and to the left of the remainder of the first sheet 46 as it is being stripped from the film frame 36. In so doing, it carries therewith the emulsion layer of the film frame 36 as well as any residual processing liquid 40 contained therein insofar as it, the emulsion layer, exhibits a greater tendency to adhere to the first sheet 58 than to the next adjacent layer of the film frame 36. Secondly, movement of the second sheet 48 to the left results in its second portion 54 being laminated to the surface of the first sheet 46 which is carrying the stripped emulsion layer, thus protecting the person who is pulling on the tab 52 from coming into contact with the emulsion layer as the first and second sheets move out completely from between the first and second sections 16 and 24 of the film mount 14. The film assemblage 10, sans the first and second sheets 46 and 48 with the emulsion layer sandwiched therebetween, is now ready to be inserted into a projector or viewer for viewing of the visible image.

In one model of a roller assembly built in accordance with the present invention the assembly included a pair of rollers having a roller center distance of 0.750 inches, the $R_1$, $R_2$ and $R_3$ radii were 0.351, 0.3705, and 0.351 inches, respectively, and the thickness of the film mount was 0.047 inches, thereby giving a first and third gap thickness of 0.047 inches and a second gap thickness of 0.009 inches in the aperture area. This thickness of 0.009 inches is the result of the film frame being 0.0035 inches thick, the first sheet 58 being 0.002 inches, the thickness of the layer of processing liquid 40 being 0.0015 inches and two layers of the second sheet 48 (0.001 inches) being 0.002 inches.

Since certain changes may be made in the above-described invention without departing from the scope thereof, it is intended that all matter contained in the above description or shown in the accompanying drawings shall be interpreted as illustrative and not in a limiting sense.

What is claimed is:

1. A transparency film assemblage comprising:
    a mount for a film frame, said mount including a first section having first and second opposite ends separated by means for defining a first aperture, and a second section having means for defining a second aperture, said first and second sections being adapted to be located in face-to-face relation with said first and second apertures located in alignment with each other;
    a container of processing liquid attached to said first end and located between said first and second sections, said container having a rupturable section located adjacent one side of said first aperture;
    means for receiving residual processing liquid, said receiving means being supported by said second end adjacent said first aperture and located between said first and second sections;
    an unexposed transparency film frame of the instant type secured to said first section in superposition to and intermediate said first and second apertures, said film frame including a strippable emulsion layer;
    a first sheet of material located between said first and second sections in covering relation to said strippable emulsion layer, said first sheet being constructed to assist in the spreading of the processing liquid across said film frame, subsequent to its photographic exposure, so as to initiate the formation of a visible image in said film frame, said first sheet being adapted to strip said emulsion layer from said film frame during the removal of said first sheet from between said first and second sections; and
    a second sheet of material having first and second portions separated by an intermediate portion, said intermediate portion being fixedly secured to an end of said first sheet at a location adjacent said rupturable section of said container of processing liquid, said first portion having a free end and said second portion being of an area at least coextensive to that of said first sheet, whereby pulling on said free end in a direction so as to withdraw it from between said first and second sections of said mount is effective to strip said first sheet and said emulsion layer from said film frame while simultaneously moving said second portion of said second sheet into covering relation with said emulsion layer being carried by said first sheet prior to said first sheet and said second portion of said second sheet being moved from between said first and second sections of said frame.

2. A transparency film assemblage as defined in claim 1 wherein said receiving means comprises a strip of absorbent material.

3. A transparency film assemblage as defined in claim 1 wherein said first sheet is opaque.

4. A transparency film assemblage as defined in claim 1 wherein said second sheet is opaque.

* * * * *